United States Patent [19]

Height et al.

[11] Patent Number: 5,666,714
[45] Date of Patent: Sep. 16, 1997

[54] METHOD OF MANUFACTURING GALVANIZED OPEN OR CLOSED STEEL SECTIONS

[75] Inventors: Trevor Maxwell Height, New Lambton; Ross Herbert Sutton, Eleebana; Gary Anthony Shester, Warners Bay, all of Australia

[73] Assignee: Tubemakers of Australia Limited, Sydney, Australia

[21] Appl. No.: 406,845

[22] PCT Filed: Sep. 22, 1993

[86] PCT No.: PCT/AU93/00488

§ 371 Date: May 30, 1995

§ 102(e) Date: May 30, 1995

[87] PCT Pub. No.: WO94/08064

PCT Pub. Date: Apr. 14, 1994

[30] Foreign Application Priority Data

Sep. 25, 1992 [AU] Australia ............... PL4948

[51] Int. Cl.[6] ............................................. B21B 1/42
[52] U.S. Cl. ................... 29/527.4; 29/527.2; 427/239; 427/433; 427/434.2
[58] Field of Search ............... 29/527.4; 427/310, 427/321, 239, 433, 434.2

[56] References Cited

U.S. PATENT DOCUMENTS

| | | | |
|---|---|---|---|
| 2,940,870 | 6/1960 | Baldwin | 427/310 X |
| 3,226,817 | 1/1966 | Simborg et al. | 427/321 X |
| 3,271,850 | 9/1966 | Menne et al. | 427/310 X |
| 3,849,167 | 11/1974 | Polc et al. | 427/310 X |
| 3,927,816 | 12/1975 | Nakamura | |
| 4,243,730 | 1/1981 | Nakayama et al. | 427/321 X |
| 4,436,292 | 3/1984 | Pfannschmidt | 427/321 X |

FOREIGN PATENT DOCUMENTS

| | | |
|---|---|---|
| 71834/91 | 8/1991 | Australia |
| 2689909 | 10/1993 | France |
| 2105661 | 8/1972 | Germany |
| 58-151463 | 9/1983 | Japan |

OTHER PUBLICATIONS

Patent Abstracts of Japan, C-300, p. 36, JP, A, 60-75568, Apr. 27, 1985.

Patent Abstracts of Japan, C-603, p. 63, JP, A, 1-47842, Feb. 22, 1989.

Patent Abstracts of Japan, C-198, p. 25, JP, A, 58-151463, Sep. 8, 1983.

*Primary Examiner*—Carl J. Arbes
*Attorney, Agent, or Firm*—Curtis Morris & Safford, P.C.

[57] ABSTRACT

A method of manufacturing galvanized open or closed steel sections eliminates the steps of pickling and rinsing. The manufacturing process is modified in such a manner that shot blasting of both sides of a strip of substantially flat steel occurs prior to a forming step in the process. After the forming process, the formed section is immersed in a flux solution.

7 Claims, 2 Drawing Sheets

METHOD OF MANUFACTURING GALVANIZED OPEN OR CLOSED STEEL SECTIONS

FIELD OF THE INVENTION

The following invention relates to a method of manufacturing galvanised open or closed steel sections. More particularly, though not exclusively, the invention relates to the manufacture of galvanised pipes.

PRIOR ART

Conventional hot dip galvanising processes rely on acid pickling to ensure a clean steel surface which facilitates the subsequent metalurgical bonding of zinc to the steel in the galvanising bath. The steps of pickling and rinsing involve high space requirements, high operating costs, the requirement of effluent streams and their associated, and increasing, burden in treatment activities.

OBJECT OF THE INVENTION

It is the object of the present invention to remove the need for pickling and subsequent rinsing in a hot dip galvanising process.

DISCLOSURE OF THE INVENTION

This invention in one broad form provides a method of manufacturing galvanised open or closed steel sections, the method comprising a roll forming process followed by a hot dip galvanising process, the roll forming process comprising the steps of:
  removing scale on both sides of a substantially flat steel strip by way on in-line shot blasting prior to forming the strip into an open section or hollow welded section,
  after the roll forming process, immersing the formed section in a flux solution, and
  the hot dip galvanising process not including a pickling or subsequent rinsing step.

By way of the above described process, the requirement of pickling the surfaces and the necessary subsequent step of rinsing the acid residues prior to fluxing is eliminated.

Preferably, the in-line shot blasting step occurs after accumulation.

Preferably, the abrasive action of the blasting is designed to achieve a Class 2½ finish.

Preferably, a synthetic water based lubricant is used as a mill coolant in the process.

Preferably, the mill coolant is passed through a cleaning or filtration station to remove suspended solids from the mill coolant prior to use in the forming process.

Preferably, in a welding step of the process, use is made of air cooled or reverse flow impeders.

DEFINITIONS

As used herein the phrase "open section" means a formed steel structure having U-shaped channels, V-shaped channels, open boxed channels, typically roll formed from a flat sheet. For example, a corrugated sheet having smooth corrugations, square corrugations or V-shaped corrugations is intended to fall within the scope of the term "open section".

The term "hollow welded section" is intended to encompass any closed section such as for example a circular pipe, or pipe of other cross section or shape, square or rectangular duct or any other form of closed cavity wherein transversely opposed longitudinal edges are mutually welded together to inscribe a closed space.

BRIEF DESCRIPTION OF THE DRAWINGS

A preferred form of the present invention will now be described by way of example with reference to the accompanying drawings, wherein.

DESCRIPTION OF A PREFERRED FORM OF THE INVENTION

Figure 1:
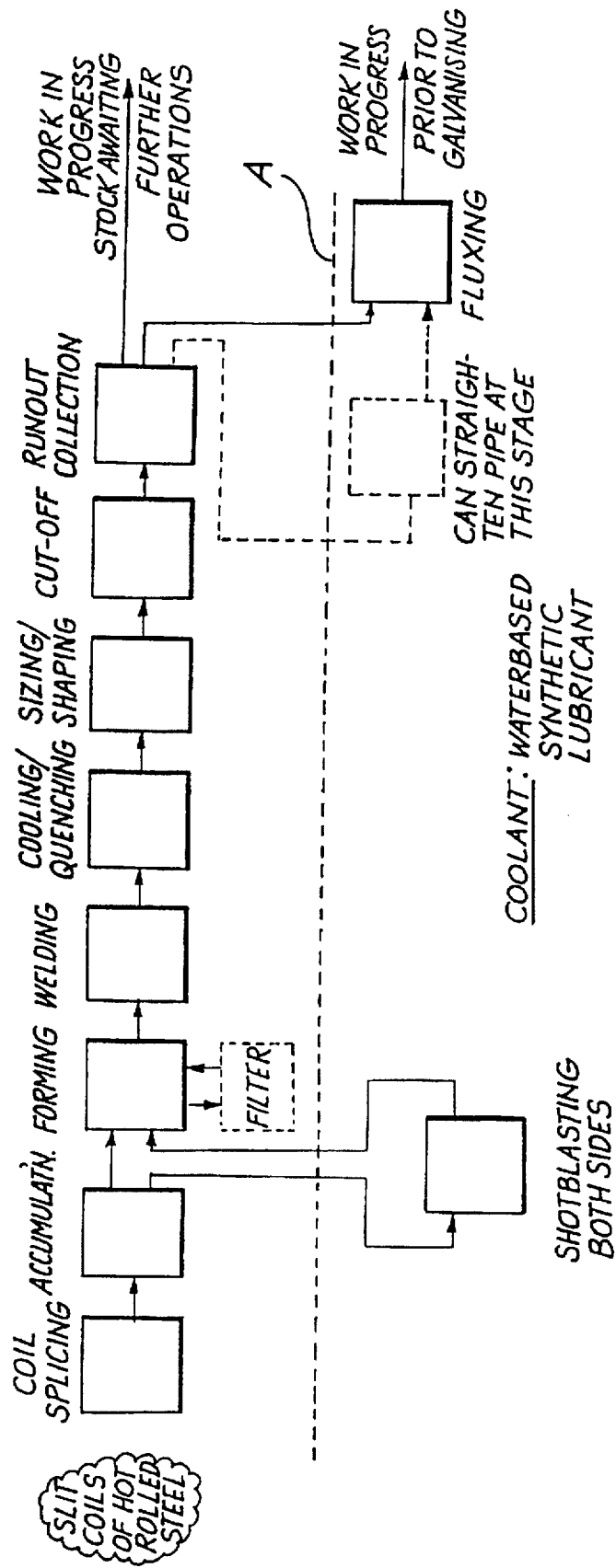
FIG. 1 is a schematic flow chart of the process steps in pipe making.
Figure 2:
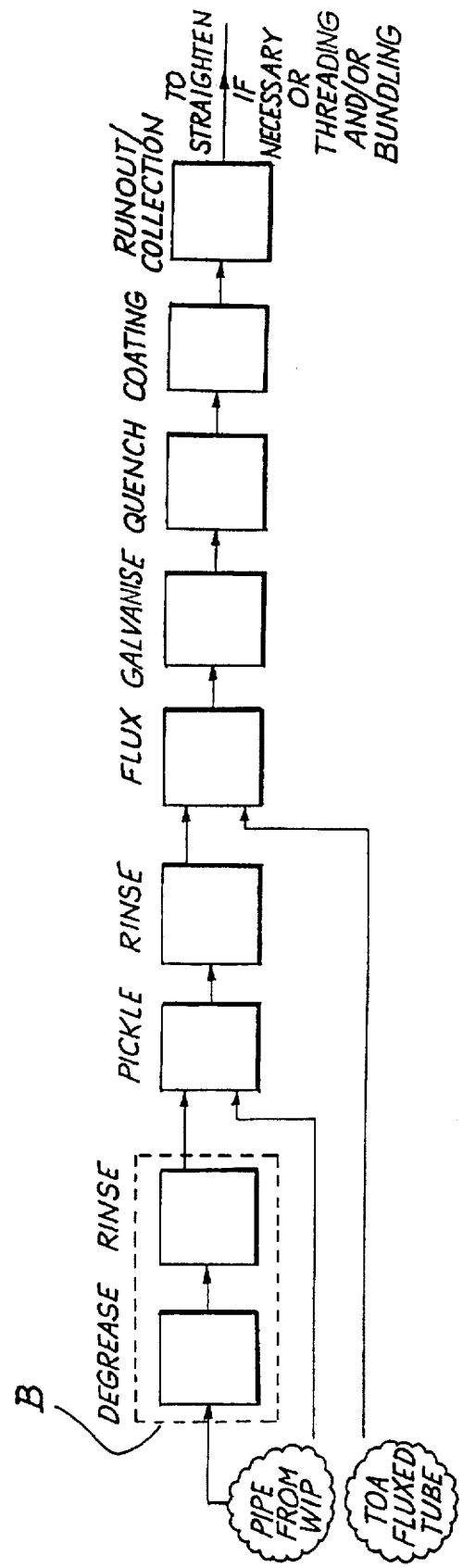
FIG. 2 is a schematic flow chart of the subsequent steps in a hot dip galvanising process.

FIGS. 1 and 2 set out the two parts in the formation of hot dip galvanised pipe. In each of the two processes shown, those being pipe making and hot dip galvanising, the top line of boxes represent individual stages in conventional manufacture. However, one additional step to the conventional process is the addition of filtration to the mill coolant to and from the forming location.

In the pipe making process, the additional process steps are shown below the horizontal dotted line A.

In the hot dip galvanising process, the optional degrease and rinse steps in the conventional process are illustrated in a dotted box B.

Conventional fully hot dip galvanising of electric resistance welded (ERW) steel pipe involves a processing train with the steps of degreasing, rinsing, pickling, rinsing, fluxing, galvanising, quenching, coating and collection as depicted in FIG. 2.

The first two stages are required if the steel surfaces are contaminated with grease or oily films. Both can usually be waived if synthetic mill lubricants are employed in place of oil based emulsions as coolants in the pipe making processes.

The pickling section is necessary in order to produce a clean steel surface, free of oxide contamination, in order to facilitate metalurgical bonding in the subsequent galvanising operation. This cleaning action has traditionally been carried out using either sulphuric acid solutions at temperatures of 60°–80° C., or hydrochloric acid solutions at temperatures of 20°–40° C.

The second rinsing step is necessary to reduce the carry over of acid and iron salts into the flux solution. Such contamination interferes with the effectiveness of the fluxing solution and leads to defects in the subsequent galvanised coatings as well as increased dross make.

The galvanising step involves complete emersion of the fluxed pipe in a bath of molten zinc for a defined period of time. This time is controlled to achieve a desired thickness of iron/zinc alloy and zinc on the steel surfaces.

The pipes are then withdrawn from the zinc bath, excess molten metal removed from both the external and internal surfaces, and then quenched in a controlled manner.

In the final two stages the pipes are coated with an organic compound to offer protection against white rusting and then collected in bundles for subsequent finishing and handling.

The space requirements and facilities necessary to carry out these operations are substantial. A significant proportion of which are determined by the pickling and rinsing sections. In addition the waste liquid streams arising from each of these two operations is considerable and requires additional plant and infrastructure support for effluent treatment.

The benefit derived from the invention is the elimination of the pickling and rinsing sections and the elimination of all effluent streams from all operations preceeding galvanising.

This benefit is achieved by modifying the pipe manufacturing process in such a manner that pipe with metalurgically clean and protected surfaces (both external and internal), is produced.

Conventional electric resistance welding (ERW) pipe making included in the depiction of FIG. 1 involves coil splicing, accumulation, forming, welding, cooling/quenching, sizing/shaping, cut-off and runout/collection.

The most common feed for ERW pipe manufacture is hot rolled steel strip in coil form which has been slit from the coil produced at a steel works on a hot strip mill. The steel thus contains a strongly adherent thin film of iron oxides.

The coil splicing stage welds the nose end of the fresh coil to the tail end of the coil which has been fed into the mill line. The purpose here is to maintain a continuous strand in the mill line from the entry point through to the cut-off.

In order to allow the mill to continue to produce pipe while the splicing of fresh coils is taking place, a buffer is maintained in the accumulator.

From the accumulator the strip is taken through a forming section where the material is progressively bent inwards until a circular profile is achieved. Significant forces are involved in this work, which generates an amount of heat, and some of the oxide scale is broken off or crushed. As a consequence it is necessary to provide a medium to cool the rolls and to remove the released scale. This has traditionally been achieved with oil based emulsions but in more recent times with synthetic lubricants.

The open seam circular shell passes through an induction coil where a high frequency power source induces an electric current along the seam. The heated edges are brought together in a set of squeeze rolls in the welding station from which a welded pipe emerges. At the welding station a series of ferrite rods are held in the bore area to focus the current along the edges of the steel. These rods, known as impeders, absorb some of the induced energy and therefor must be cooled. Traditionally this cooling has been achieved using the mill coolant directed along the impeders, a situation which leads to a liquid filled bore.

The welded pipe then passes through an external bead scarfing station and then a cooling/quenching zone where through combination of air cooling and mill coolant impingement on the weld zone, the pipe surface temperatures are brought into equilibrium.

The pipe then passes through a second set of roll stands to be reduced to a final pipe size or to be formed into the desired non-circular shape.

The pipe then continues into a cut-off where individual pieces of a desired length are automatically cut from the emerging mill continuous strand. The individual pieces pass across a runout table, where inspection Is routinely carried out, and then into collectors. Here the product is collated into manageable parcels, usually lots of between 1 and 7 tonne, in readiness for further operations, one of which can be fully hot dipped galvanising.

The modifications to the process which are disclosed herein are as follows:

Firstly, the scale on the steel surfaces (both sides) is removed by way of in-line shot blasting located after the accumulator and prior to entry into the mill forming section. The abrasive action of the blasting is designed to achieve a Class 2½ finish on both sides of the strip.

Secondly, the full effectiveness of the blasting before forming and the subsequent fluxing after cut-off may be achieved when the pipe is formed with a dry bore. Therefore, in the forming section, a synthetic water base lubricant may be used as the mill coolant to prevent oil contamination of the surface. The coolant is directed at the rolls in order to minimise any entrapment in the bore region. Subsequent wiping of the bore area prior to welding ensures that no coolant from the forming region is retained in the bore.

Further coolant ingress is avoided by using either reverse flow impeders, or air cooled impeders at the weld station.

Thirdly, within a short period after the pipe has been built up into the manageable parcels after this runout, the product must be emersed into a flux solution.

It has been found that ideally this time should not exceed one hour, although in favourable atmospheric conditions, acceptable results have been achieved with delays as long as 24 hours. It has also been found that in this period of time the product which may have come from the mill in a bent condition, can be processed through a rotary straightener without adversely affecting the subsequent action of the fluxing solution.

The flux solution should ideally be the zinc ammonium chloride tripple salt $ZnCl_2.3NH_4Cl$ dissolved in water to achieve a density of 1.20 at 60° C., although a wider range of density values can still provide acceptable results. Some ferrous smut remaining from shot blasting together with some debris from the welding process is removed during the emersion and drainage of the flux. In order to prevent a build up of potential contaminants of material which will subsequently generate a higher dross make in the galvanising, this flux solution should be subjected to continuous filtration.

Best results may be achieved with initial emersion times of 5 minutes although shorter periods might still provide adequate performance. Care should be taken during emersion to ensure that no air becomes entrapped in the bundle, either in the bores of the pipes or within the interstices between adjacent pipes.

After emersion, the bundle is drained and then either fed directly to the galvanising bath or placed in a storage area awaiting galvanising. The storage area should be such that no water can impinge on the pipe surface and adequate ventilation is provided to prevent the steam or water vapour refluxing in the bores or the interstices. Such refluxing action might wash the surfaces free of the protective flux layer leading to rusting of the steel. Such condition would subsequently result in faulty galvanising.

It should be appreciated that modifications and alterations to the process described herein which are obvious to those skilled in the art are not to be considered as beyond the scope of the present invention. For example, whilst the above description is by way of example directed to pipe making, the process is equally applicable to the production of any other galvanised open or closed steel sections.

We claim:

1. A method of manufacturing galvanized open or closed steel sections, the method comprising a roll forming process followed by a hot dip galvanizing process, the roll forming process comprising the steps of:

removing scale on both sides of a substantially flat steel strip by way of in-line shot blasting prior to forming the strip into an open section or hollow welded section, after the roll forming process, immersing the formed section in a flux solution, and the hot dip galvanizing process not including a pickling or subsequent rinsing step.

2. The method of claim 1 wherein the in-line shot blasting occurs after accumulation.

3. The method of claim 1 wherein the abrasive action of the blasting achieves a class 2½ finish.

4. The method of claim 1 wherein a synthetic water based lubricant is used as a mill coolant.

5. The method of claim 4 wherein the mill coolant is passed through a cleaning or filtration station to remove suspended solids from the mill coolant prior to use in the forming process.

6. The method of claim 1 wherein the said forming comprises a welding step wherein use is made of air cooled or reverse flow impeders.

7. A galvanized open or closed steel section formed in part by the method of any one of the preceding claims.

* * * * *